(12) United States Patent
Dessureault et al.

(10) Patent No.: US 7,065,476 B2
(45) Date of Patent: Jun. 20, 2006

(54) ADAPTABLE MULTI-REPRESENTATION BUILDING SYSTEMS PART

(75) Inventors: Paul Fred Dessureault, Weare, NH (US); Gregory Vazzana, Deerfield, NH (US); Soren Abildgaard, Hopkinton, NH (US); Craig Storms, Weare, NH (US)

(73) Assignee: Autodesk, Inc., San Rafael, CA (US)

( * ) Notice: Subject to any disclaimer, the term of this patent is extended or adjusted under 35 U.S.C. 154(b) by 808 days.

(21) Appl. No.: 10/127,193

(22) Filed: Apr. 22, 2002

(65) Prior Publication Data

US 2003/0200062 A1    Oct. 23, 2003

(51) Int. Cl.
G06F 17/50 (2006.01)
G06F 7/62 (2006.01)
G06F 17/10 (2006.01)

(52) U.S. Cl. .............................. 703/2; 703/1
(58) Field of Classification Search ............ 703/17, 703/1, 2

See application file for complete search history.

(56) References Cited

U.S. PATENT DOCUMENTS

| 5,268,999 A | 12/1993 | Yokoyama |
| 5,768,149 A * | 6/1998 | Umney et al. ............... 703/1 |
| 2001/0052908 A1 * | 12/2001 | Hartman ................... 345/630 |

* cited by examiner

Primary Examiner—Paul L. Rodriguez
Assistant Examiner—Andre Pierre-Louis
(74) Attorney, Agent, or Firm—Gates & Cooper LLP (57) ABSTRACT

One or more embodiments of the invention enable a method, apparatus, article of manufacture, and data structure for an adaptable multi-representation building systems data structure in an application program. The data structure comprises a single object that can represent a real world component used throughout a building life cycle, from preliminary design throughout a life of the building. As design decisions are made, the single object can acquire further definition, gaining one or more characteristics that characterize and specify the real-world component. The single object and a connector of the object can recognize and automatically connect to a valid subsystem. Further, the single object can represent itself in multiple graphical and non-graphical displays.

76 Claims, 9 Drawing Sheets

ADAPTABLE MULTI-REPRESENTATION BUILDING SYSTEMS PART

BACKGROUND OF THE INVENTION

1. Field of the Invention

The present invention relates generally to computer drawing applications, and in particular, to a method, apparatus, and article of manufacture for representing a real world component using a single object throughout multiple stages of a drawing.

2. Description of the Related Art

The use of Computer Aided Design (CAD) application programs is well known in the art. CAD application programs are used for generic design or specialized systems such as architecture, engineering, and construction (AEC) systems. For example, a CAD application program may be used in the creation and modification of an HVAC (heating, ventilation, and air conditioning) system, a plumbing and piping system, an electrical system, cable tray, conduit, a communications network, etc.

Figure 1:
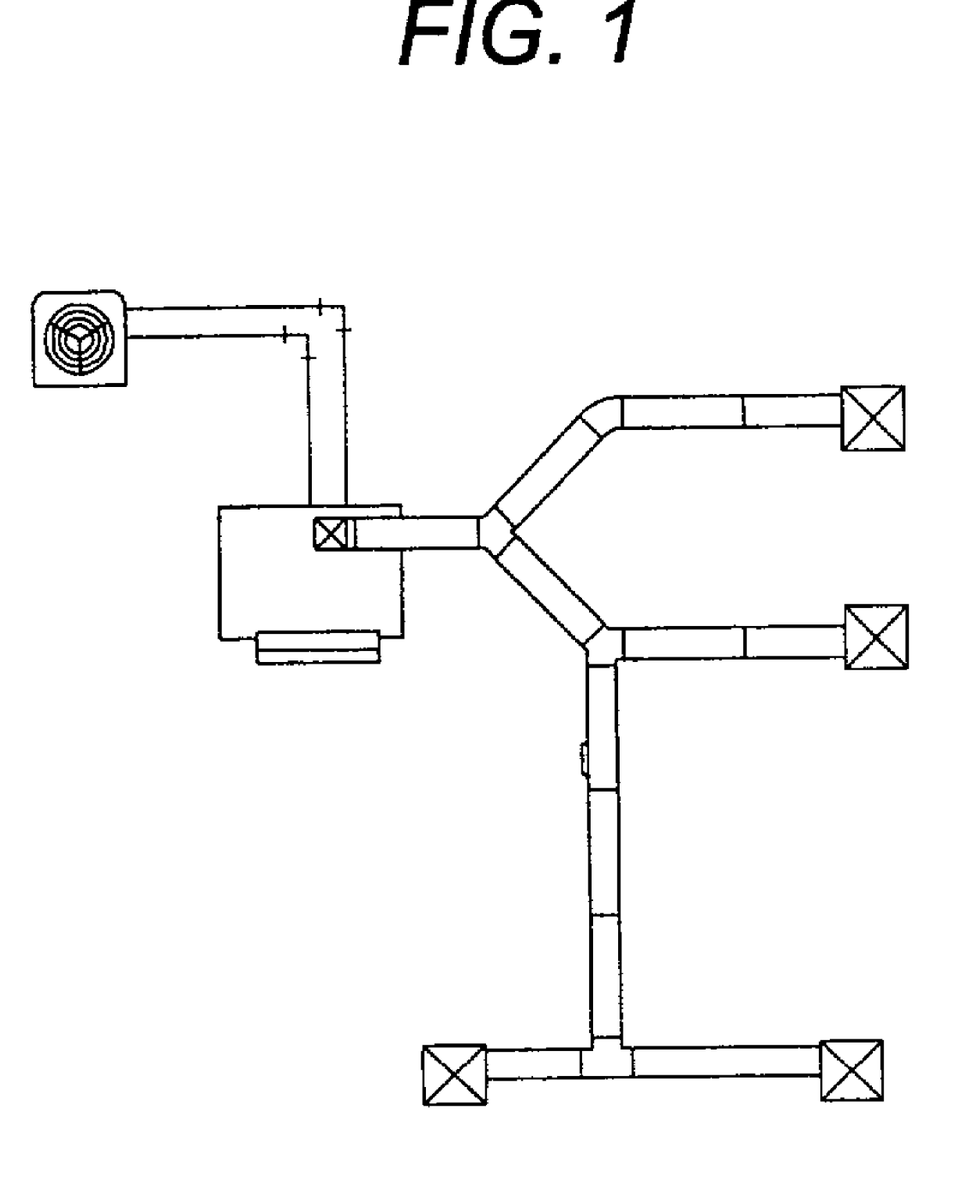
FIG. 1 illustrates a typical example building system (HVAC) with hydronic piping & air ducting subsystems.

Such systems may be further broken down into one or more subsystems. A subsystem is any fully connected set of components that share the common function of carrying the same fluid. For example, an HVAC system might include gas pipe, hydronic pipe, and air duct subsystems. Key components link to more than one subsystem and serve the function of transferring energy from one subsystem to the next. For example, cold water might be used to cool air. FIG. 1 illustrates a typical example building system (HVAC) with hydronic piping and air ducting subsystems.

A CAD system may be further utilized to display different systems or subsystems. For example, a CAD program may be used to display a plumbing system model, a fire protection system model, a plumbing riser diagram, a piping system model, sewer piping, an HVAC ductwork model, electrical single-line and multi-line schematics, electrical power and lighting models, electrical cable tray models, etc.

Figure 2:
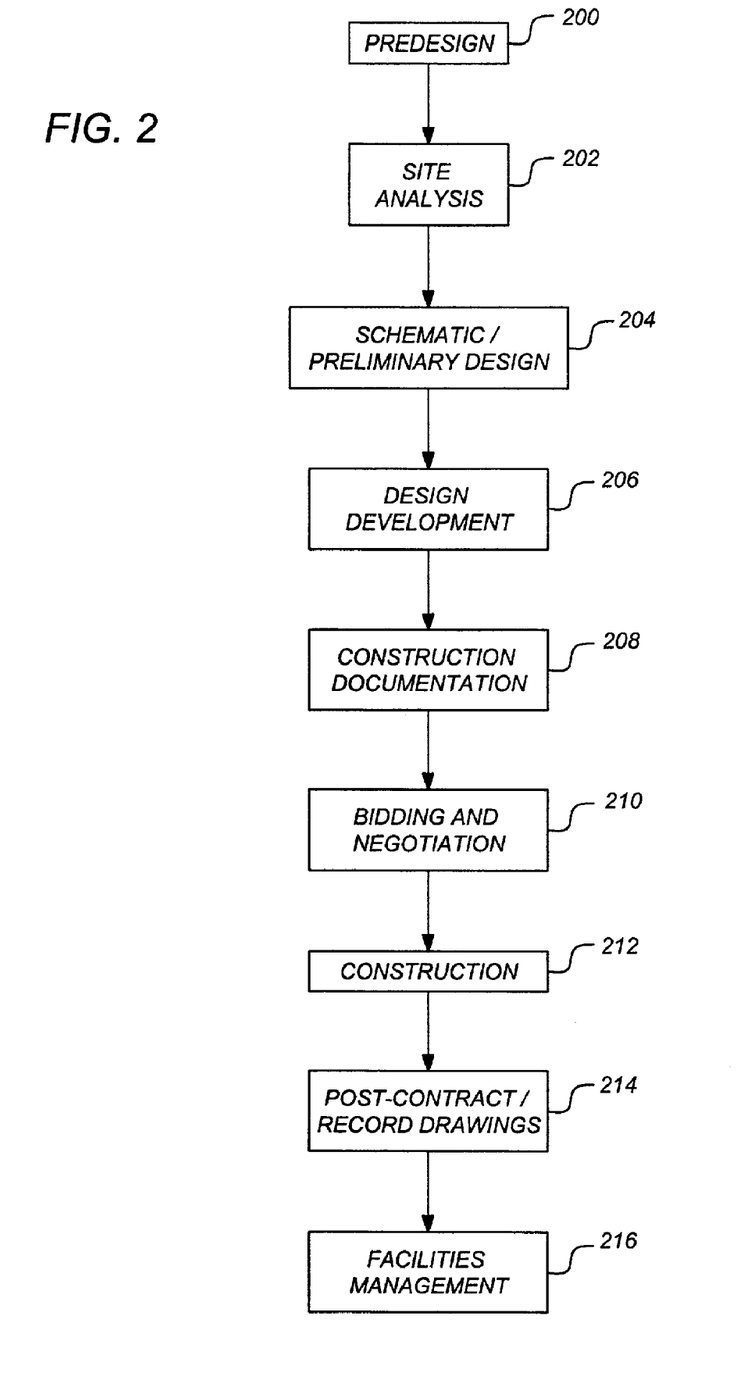
FIG. 2 illustrates the AEC design/construction/maintenance process.

A CAD system is also used at various stages in a building process. FIG. 2 illustrates the AEC design/construction/maintenance process. The CAD program may be used in one or more of the stages indicated (i.e., predesign 200, site analysis 202, schematic/preliminary design 204, design development 206, construction documentation 208, bidding and negotiation 210, construction 212, post-contract/record drawings 214, and/or facilities management 216).

However, at different stages in the design process, different levels of detail may be known (i.e., by the person using the CAD system). For example, during the preliminary design stage 204, a type of equipment may be known but engineering specifications may be incomplete. In another example, specific piping sizes and manufacturer information may be known during the construction stage 212 but not during any stages prior to stage 212.

Based on the differing information known at different stages, different components may be used in a CAD system at each stage. For example, an empty box may be created and used during the predesign stage 200. Once detailed information is known, the empty box is deleted and a new specific component that contains details for the component is added. Thus, in the prior art, different parts are used at different stages in the building development process. While such prior art embodiments may be useful, it is not efficient, and is time consuming during the development process.

SUMMARY OF THE INVENTION

One or mote embodiments of the invention provide a method, apparatus, article of manufacture, and data structure for representing a real world component/object throughout a building life cycle, from preliminary design throughout the life of the building. During early design stages (i.e., when the amount of information known to the user is limited), a simple placeholder that defines minimum requirements (e.g., "pump" or "fan") may represent the object. Thus, the object is defined without specific design information (e.g., no real world size or engineering characteristics).

As design decisions are made and the building cycle progresses, the object may be further defined to include the newly acquired information. Accordingly, during the building cycle, the object gains the characteristics of a fully engineered part that may be further characterized to specify a real-world manufactured part.

The object may be shared across disciplines (e.g., architects and engineers) and duplicate representations of the same object are eliminated. Further, the part is adaptable in that it "learns" design characteristics throughout the design cycle. Also, the object has the capability to recognize subsystems and automatically connect to other systems/subsystems. Such connection capabilities may also be further enhanced with connection rules that only allow valid subsystem connections. Additionally, the object may represent itself in multiple graphical and non-graphical displays using either fixed graphics or a fully parametric design.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

A building systems part is represented by a single object that can represent many real world components used throughout a building life cycle, from preliminary design throughout the life of the building. The object can be as simple as a starting placeholder defining minimum requirements (e.g., a pump or fan) without specific design information (e.g., no real world size or engineering characteristics). As design decisions are made, the object acquires further definition, gaining the characteristics of a fully engineered part that can be further characterized to specify a real-world manufactured part.

Benefits to using such a single object include: use of a single object that is shared across disciplines (e.g., architects and engineers), elimination of duplicate representations of the same object, adaptable part allows "learning" of design characteristics throughout the design cycle, parts and their connection recognize subsystems and automatically connect, connection rules prevent errors by only allowing valid subsystem connections, graphical representation may be either fixed graphics or fully parametric, single object can represent itself in multiple graphical and non-graphical displays, systems and subsystems ate represented with a complete network topology, and network topology enables engineering analysis and refinement of systems.

Hardware Environment

Figure 3:
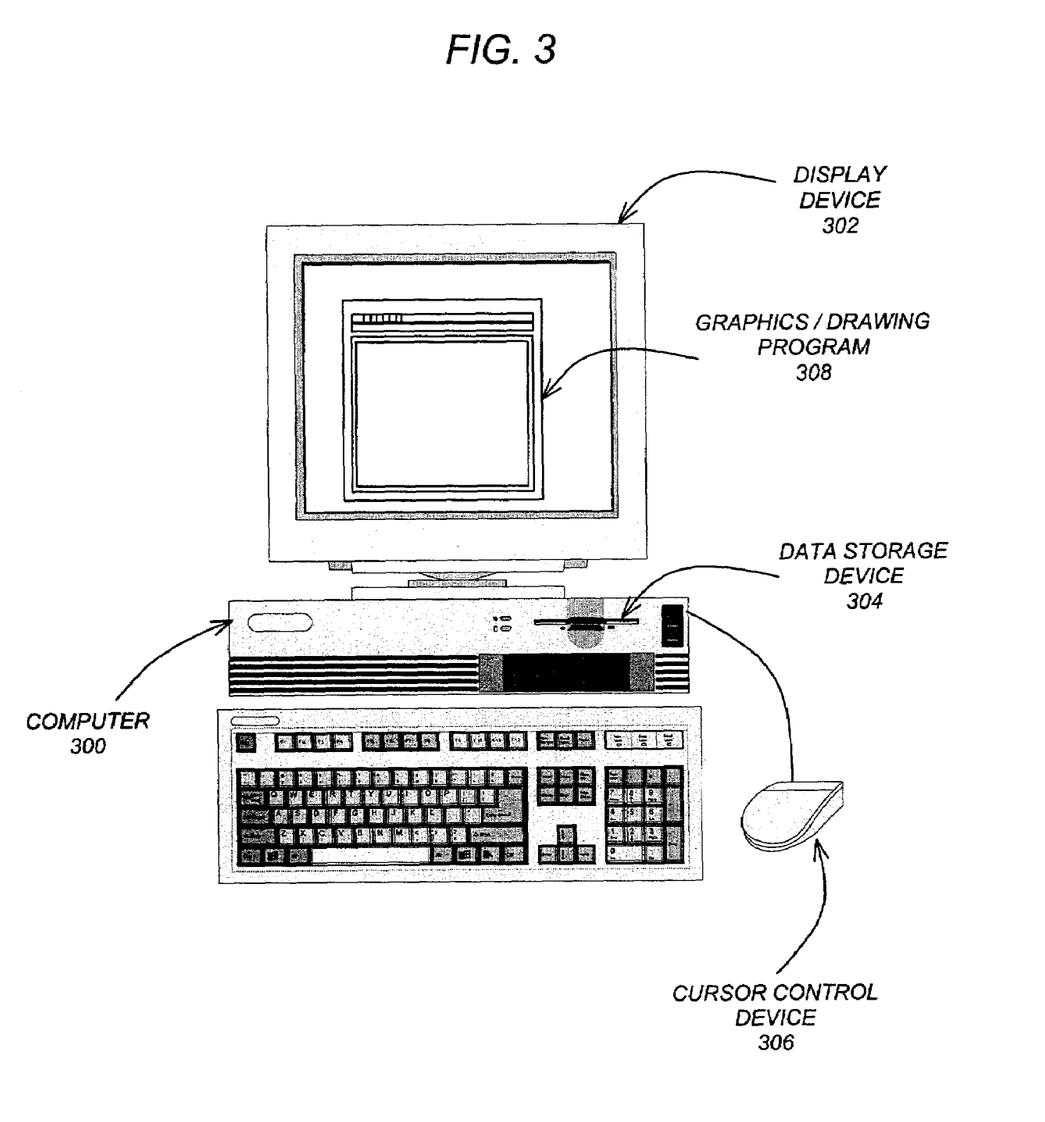
FIG. 3 is an exemplary hardware and software environment used to implement one or more embodiments of the invention.

FIG. 3 is an exemplary hardware and software environment used to implement one or more embodiments of the invention. Embodiments of the invention are typically implemented using a computer 300, which generally includes, inter alia, a display device 302, data storage devices 304, cursor control devices 306, and other devices. Those skilled in the art will recognize that any combination of the above components, or any number of different components, peripherals, and other devices, may be used with the computer 300.

One or more embodiments of the invention are implemented by a computer-implemented graphics/drawing program 308, wherein the graphics program 308 is represented by a window displayed on the display device 302. Generally, the graphics program 308 comprises logic and/or data embodied in or readable from a device, media, carrier, or signal, e.g., one or more fixed and/or removable data storage devices 304 connected directly or indirectly to the computer 300, one or more remote devices coupled to the computer 300 via a data communications device, etc.

Those skilled in the art will recognize that the exemplary environment illustrated in FIG. 3 is not intended to limit the present invention. Indeed, those skilled in the art will recognize that other alternative environments may be used without departing from the scope of the present invention.

General Structure

One or more embodiments of the invention provide for representing a product/component in a single object of a graphics/drawing program 308 throughout the building design process. The single object is a component of a system for which the topology (connectivity) of the system may be a fundamental property of the system. The single object of the invention may be used in a variety of disciplines.

At a fundamental level, the single objects are able to capture and represent all meaningful real world properties.

Building systems require a network topology with well-defined properties associated with each system, branch, or component. Each "system" is assembled using manufactured and fabricated parts to support the flow and manipulation of a fluid (liquid or gas, further generalized to include electrical current) throughout the topology. Manufacturing standards, engineering principles, and the laws of physics apply. If there is a behavior or property of the system that affects the engineering intent, construction, or maintenance of the real world system, then the behavior or property should in principle be integrated into the building model.

As utilized herein, varying terms may be used to describe the representation of an object (i.e., a part). The varying terms may include one or more of the following:

"Part"—A building system segment, fitting, or piece of equipment used to assemble any building system (e.g. Duct systems, Pipe systems, electrical, communication, etc.).

"Placeholder Part"—A part placed in a design because enough information is known to require this part, but not enough to actually size the part. For example a duct tee may be positioned along a run of duct to route air to different rooms. However, until the calculations are complete to determine the amount of air needed, it is not possible to size the duct or duct tee. The part then is "unsized" but still a duct tee. Similarly, the size of the fan needed to move the air cannot yet be determined, yet it is known that some fan will be used. Placeholder parts are used in both of these cases. Note that for convenience, a designer may choose to select a specific size (as a best guess) and in this case the part is still formally a placeholder.

"Generic Part"—May be a placeholder with unsized information, or a part defined well enough to be selected from a manufacturer, but this selection has not yet been done. Generic parts may have any level of definition from completely unsized to completely sized.

"Manufacturer-specific Part"—Generally, this defines a part that is fully sized and identified with a specific manufacturer, possibly a specific model number of the part. However, an alternative may be that a designer knows which manufacturer will be used prior to completing the sizing calculations. In this case, the part may have the manufacturer specified yet still be a Placeholder part.

"Engineering-specific part" (also referred to as a fully engineered part)—Generally, this defines a part that has been specified to meet the engineering requirements of a system. Properties specified may vary widely. For example duct or pipe materials, pipe schedules, pressure ratings, and equipment performance ratings may be part properties which specify the engineering requirements of a part.

Each of the above part categories (i.e., part, placeholder part, generic part, manufacture-specific part, and engineering-specific part) may overlap with each other and are not intended as rigid absolute definitions. However, the above categories are useful for clarity, but remain highly flexible terms. Accordingly, at the extremes are a fully unsized placeholder part (no sizing or manufacturer information known) and a fully engineering-specific and manufacturer-specific (exact manufacturer, model, and engineering specification known). However, in between these extremes, the intermediate terms may be conceptually useful but are not absolute.

In addition to the above categories, the term "Adaptable Part"0 refers to a building systems part that may be represented in varied states, from the purely unsized "Placeholder" to the fully "Engineering and Manufacturer-specific". The adaptable part is capable of acquiring new information throughout the life cycle of a building design and its maintenance, and also may be modified in ways that where necessary reduce the level of definition of the part.

As illustrated in FIG. 2, the building model begins with predesign 200, but going forward plays an increasingly important role in the actual construction and maintenance of the system. For example, there is a "downstream" benefit to providing an intelligent building model to building owners. Further, actual facility management 216 can and may be based off an accurate model of the facility. Accordingly, long term, change control is made easy such that automation of "as built" data may be updated with little effort. The long-range benefits bases equipment maintenance cycles, organizational and space planning, and building renovation on the downstream building model. Such a building model provides a framework for managing the life cycle of the building.

During the building process 200–216, each system is assembled from an inventory of manufactured and custom parts. Each system is designed as a whole, with individual components contributing to the final solution, but generally being of limited value outside of the networked configuration of parts. In embodiments of the invention, individual parts such as pipe elbows, air diffusers, switches, etc., stand alone as well defined parts, but also link to each other to create an intelligent system of parts. Properties such as flow rate, linear velocity, pressure or voltage drop, location, and proximity to other parts may also be recognized within the system.

Further, a building system object model of the invention supports the implementation of tools to create, query, and revise each system. The model also supports flexible design approaches, for example the layout of ducts or pipes with optional sizing requirements at the time of initial layout. For example, if an engineer or designer wants to layout 6" round ducts, the system will provide the support for such ducts. Alternatively, if an engineer/designer wants to use single-line pipe or duct routing without sizing (size undefined) the system will allow/support such a use. When choosing real world equipment, the system supports placeholder parts, along with both engineering specific and manufacturer-specific parts.

Additionally, designers/engineers are able to easily move whole branches of the system, re-route the paths, resize the paths, and update components based on engineering specifications and basic rules (e.g. duct size calculations). Wherever possible, families of parts (e.g. pipe elbows) may also size up/down along with duct/pipe resizing calculations.

Parts may also insert and snap together automatically, aligning themselves as needed to model real world behavior. Such parts may be generalized in implementation to embrace CAD and non-CAD applications, preserving a reasonable level of intelligence for the purposes of equipment selection, estimating, and design.

Elbows and other fittings that are required to turn corners or branch the topology may automatically insert based on the context of the "changing path" being routed through the building. Rules of compatibility between parts may prevent mismatched parts and facilitate finding appropriate parts or replacement of parts in a revision. Each part placed in a design may also have a revision history and be associated with the history to enable rigorous change control and tracking procedures. The graphics used to represent a part is also customizable to allow new parts (content) to be added without programming.

Schedule generation is automatic and fully configurable, with bi-directional updates. At a very basic level, a simple definition of the real world parts common to all aspects of the AEC industry is provided. The definition may not necessarily be drawing-based CAD, but may comprise a spreadsheet of data of the most general format that may serve as the "lowest common denominator" for all building services content (parts & equipment).

To support all of the above features, base objects may be published by or available in a development framework. These base objects may be used for a broad range of applications, while also recognizing potential issues with local market standards. The base technology may be global and well suited to create a robust family of applications. Therefore, the single objects may be flexible and extensible using display representations and other mechanisms that preserve object interoperability across multiple applications and support for global product development and add-on or supplemental software packages that provide enhancements to design. Such interoperability provides a benefit to the customer in more intelligent applications and excellent data compatibility.

The relationship between parts and equipment, object styles, and individually assigned object properties is well defined, unambiguous, and flexible. A system of parts supports a level of detail that conveys the intent of the engineer/designer but is not forced to be permanently tied to a specific manufacturer. In practice, a preferred manufacturer may be implied, so the system may quickly and easily map the design component parts (i.e., a genetic part) to real world manufacturer part numbers—and just as easily examine alternative manufacturers or remove manufacturer dependencies to produce an engineering-specific but manufacturer-independent (i.e., generic) design (both cases are common). Such advantages can significantly affect design and construction costs, time to construction, and the overall revision control process for a project.

One or more embodiments of the invention may provide support for a variety of systems and subsystems. Examples of supported systems may include HVAC (in residential and commercial buildings such as ductwork subsystems (generally rectangular, round, or oval ducts to carry air), hydronic pipe subsystems (closed water systems to transfer heat), or gas pipe subsystems (to fuel boilers, etc.). Other supported systems may include electrical (wiring of both residential and commercial buildings), telephone & computer networks (communications wiring to support telephone and computer networks throughout a home or office), lighting design, energy simulation, and piping (from low-end to high-end). For example, piping may include residential plumbing, commercial plumbing and fire protection, commercial piping, industrial piping, process piping, and sewer piping.

Single Objects

The general components in a network are components used to describe the topology and the physical behaviors and properties of the network. The connectivity of components (i.e., the structure or topology of the entity) is used to navigate in the system.

At the high end, piping applications require objects with intelligent connectivity, parametric "spec-driven" database lookup (and automated selection) of real world components such as valves and fittings, automated pipe length calculations, and multiple views in both 2D and 3D.

Figure 4:
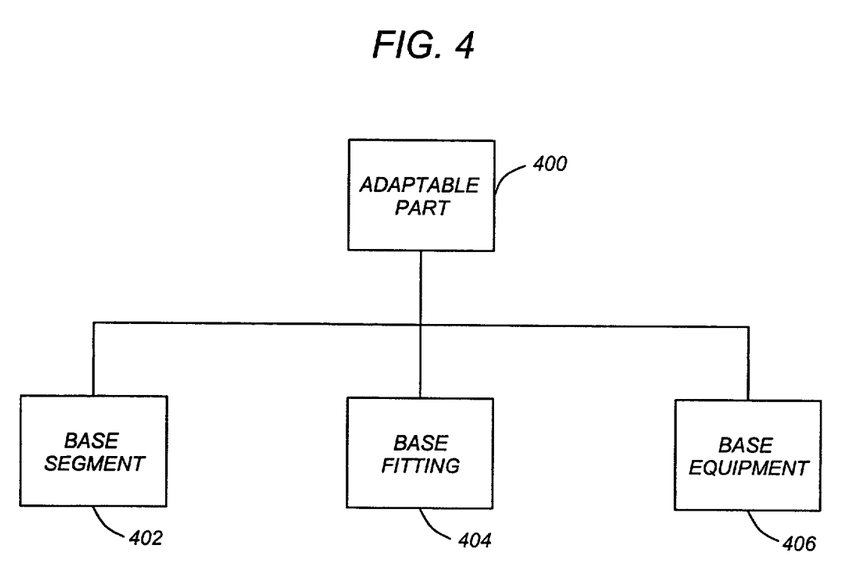
FIG. 4 illustrates the relationships between a base component and derived component in accordance with one or more embodiments of the invention.

The common properties and behavior of an object are placed in a base-component from which additional components can derive. The relationships between a base component and derived components are illustrated in FIG. 4.

As illustrated, there are four fundamental types of components that can derive from an adaptable part 400:

- Base Segment 402—A section of pipe or duct that varies in length and has a fixed cross-sectional shape;
- Base Fitting 404—Generally an off-the-shelf part used to alter the direction or flow of the Base Segment 402, such as an elbow, tee, damper or valve; and
- Base Equipment 408—Equipment that integrates with one or more subsystems, such as an Air Handler, Pump, or Fan.

Each of the fundamental building services components 400–406 have common properties and behavior and may support multiple functions. For example, the building services components 400–406 may support an identity, connectors, connectivity, physical properties, fluid properties, easy manipulation, interference checking, multiple display representation, design rules, and component selection/assignment.

An identity for a component 400–406 provides a name, description, part identifier, classification, etc. that is used to identify each component 400–406.

Connectors provide the interfaces between the part/component 400–406 itself and other systems or components 400–406. Each connector may comprise a medium (also referred to as a domain), a subsystem, a profile and size, a direction, a position and rotation, a connection type, usage, and one or more rules. The subsystem is generally set by the medium and usage (e.g., return air hot water supply, waste water, etc.). For example, for pipes, the medium may be water, steam, medical gasses, etc. In another example, return air or supply air are different subsystems, both part of an overall system. Flow direction indicates exhaust versus return. Position indicates the position for the connection. Rules are used to determine if a legal connection between connectors is formed. A legal connection is formed when a connection test based on connection rules is passed successfully. Additionally, rules may be customizable and extendable.

Connectivity enables each component 400–406 to connect itself to a network based on logical rules of subsystem type and connection profile. Parts/components 400–406 are connected into systems through connectors. Further, the connected systems may be created automatically based on user configurable rules.

Support for physical properties provides that each component 400–406 may have real world physical properties set such as their material and other engineering characteristics.

Fluid properties support provides that each component 400–406 represents both the physical part in the building system and the engineering function: transport and manipulation of a fluid. Properties such as fluid flow rate, velocity, and pressure may be set throughout subsystems.

Easy manipulation support provides for the ability to easily resize the dimensions for the component 400–406 and/or to lookup/replace components 400–406 with similar function & properties. For example, simple and logical swapping of generic/manufacturer-specific "equivalent parts" may be integrated with right-click editing to choose an assignment (if generic) or substitution (if manufacturer-specific).

Interference checking support provides that the components 400–406 are able to check for (and alert the user of) interference with other parts of the building model. The most critical interference checking determines if an overlap with structural objects and other building system components (particularly waste water pipes) exists. Such interferences are "large and difficult to move" and may therefore be most critical from a design point of view.

Display representation support provides that each component 400–406 is able to display itself The display can show the real physical size and shape of the component 400–406 (both 2D and 3D), or just a symbol, depending on the context. Display representations are highly flexible and customizable to support product localization, manufacturers, and end-user customization. Thus, a part/component 400–406 can represent itself in multiple ways depending on the user's need. For example, a component 400–406 may be capable of representing itself as a 3D model representation for rendering, 2D representation for construction documents, schematic representation for diagrams, or textual representation for specifications. Such multiple display representation support allows the user to only place one part and use the part for multiple purposes while minimizing redundant data.

Design rules provide that each component 400–406 may be matched to specific design criteria (types and styles of subsystems) based on pre-defined specifications (to limit part selection). Component selection/assignment support enables a part/equipment library lookup for a variety of types of parts such as placeholder, generic, manufacturer specific, and/or engineering-specific parts. Additionally, access to manufacturer data may also be available via a web-friendly mechanism to facilitate flexible design decision-making. To enable such a solution, a minimum level of consistency in manufacturer data may be required.

Figure 5:
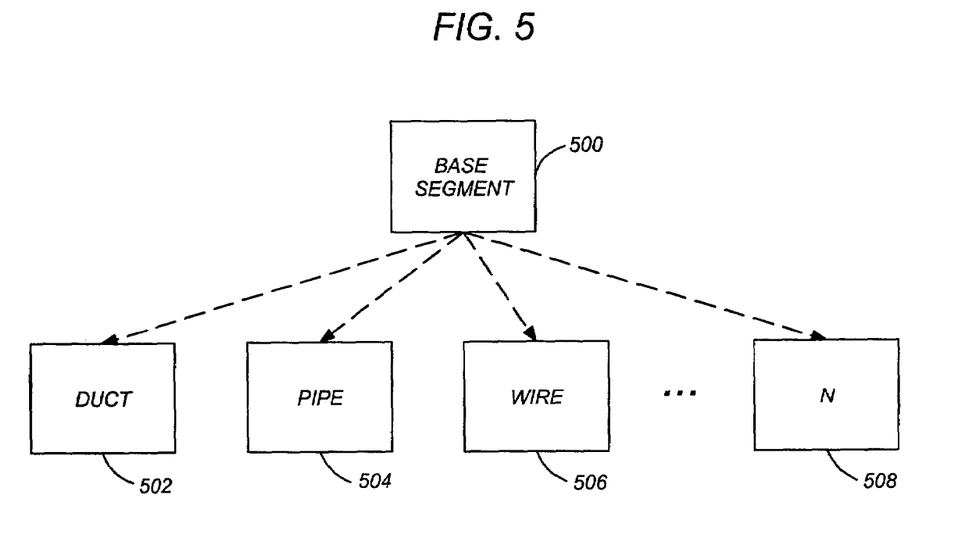
FIG. 5 illustrates the foundation for a base segment in accordance with one or more embodiments of the invention.

FIG. 5 illustrates the foundation for a base segment 402 in accordance with one or more embodiments of the invention.

A base segment class 500 forms the foundation for duct 502, pipe 504, wire 506, and other classes 508. In this regard, the segment 500 may store all persistent data and display methods but duct 502 defines the name of the object, the display properties, and overrides various methods to define unique behaviors.

Figure 6:
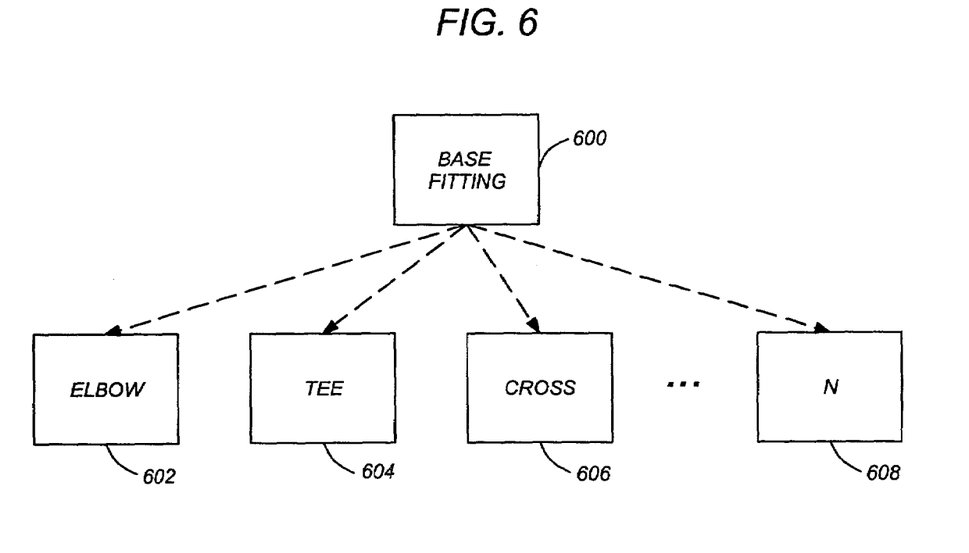
FIG. 6 illustrates the foundation for a base fitting class in accordance with one or more embodiments of the invention.

Base Fittings 404 are components that control flow transitions such as direction, branching, or other significant change within the network. Examples of fittings 404 include elbows, tees, dampers, valves, etc. In all cases, fittings may involve two (2) or more connections, often but not always to segments 402 (e.g., ducts 502, pipes 504, wires 506). FIG. 6 illustrates the foundation for the base fitting 404 class in accordance with one or more embodiments of the invention. As illustrated, the base fitting class 600 forms the foundation for elbow 602, tee 604, cross 606, and other 608 classes.

As described above, equipment 406 integrates with one or more subsystems. What makes equipment 406 unique is that these components may integrate with a minimum of one subsystem (meaning they can integrate with multiple subsystems) and have a wide number and range of connection types and locations.

For example, a heat exchanger may have a coil which connects to a hydronics pipe system and duct connections, or it may connect two different duct subsystems (exhaust and intake air, for example). Custom equipment 406 involves custom graphics combined with varied placement of "n" connectors. It is the type and placement of the connections which defines the equipment's 406 function, along with specific values to be associated with the subsystem (such as a rate of heat exchange and other specifications).

A connection may be made when two connectors of a matching type are placed together, thereby creating a permanent connection. Connection criteria may include physical style, profile, and conceptual style. The physical style criteria determine whether the two connectors (and their parent objects) match (e.g., can a 2" pipe be connected to a 2" pipe elbow?). The profile criteria examine the profile of the connector (e.g., round vs. oval, custom, etc. [including size]). If profiles do not match, the two subcomponents cannot be connected (e.g., a round duct cannot connect to a rectangular duct). The conceptual style criteria determine if the subsystems match (e.g., a hot water pipe cannot be connected to a cold water pipe). Thus, connection criteria evaluate various characteristics of a component to determine appropriate connections. For example, male/female pipe fittings or opposite fittings may be required.

Different building systems objects (e.g., equipment 406 or fittings 404 ducts such as elbows, terminals, equipment, etc.) may have different numbers and types of connectors. For example, an elbow or duct segment may each have two connectors, a tee may have three connectors, etc. Custom equipment may have "n" connectors of varied types. For example a packaged Rooftop Unit may have two or more connectors for ducts (that enables participation in a duct subsystem graph) and may have two or more connectors for hydronic pipes (that enables participation in a hydronic pipe subsystem).

Criteria, Subsystems, and Styles

Each subsystem has general styles to characterize the types of components and fluid flow it supports (hot water, cold water, air, etc.) along with its profiles (cross sectional shapes and sizes). The snap-together behavior of components may be largely driven by two styles—the physical style describing the characteristics of the real world part (more specifically, it's connection rules & geometry) and the conceptual/engineering intent of the part (i.e., the type of subsystem it is connected to).

Figure 7:
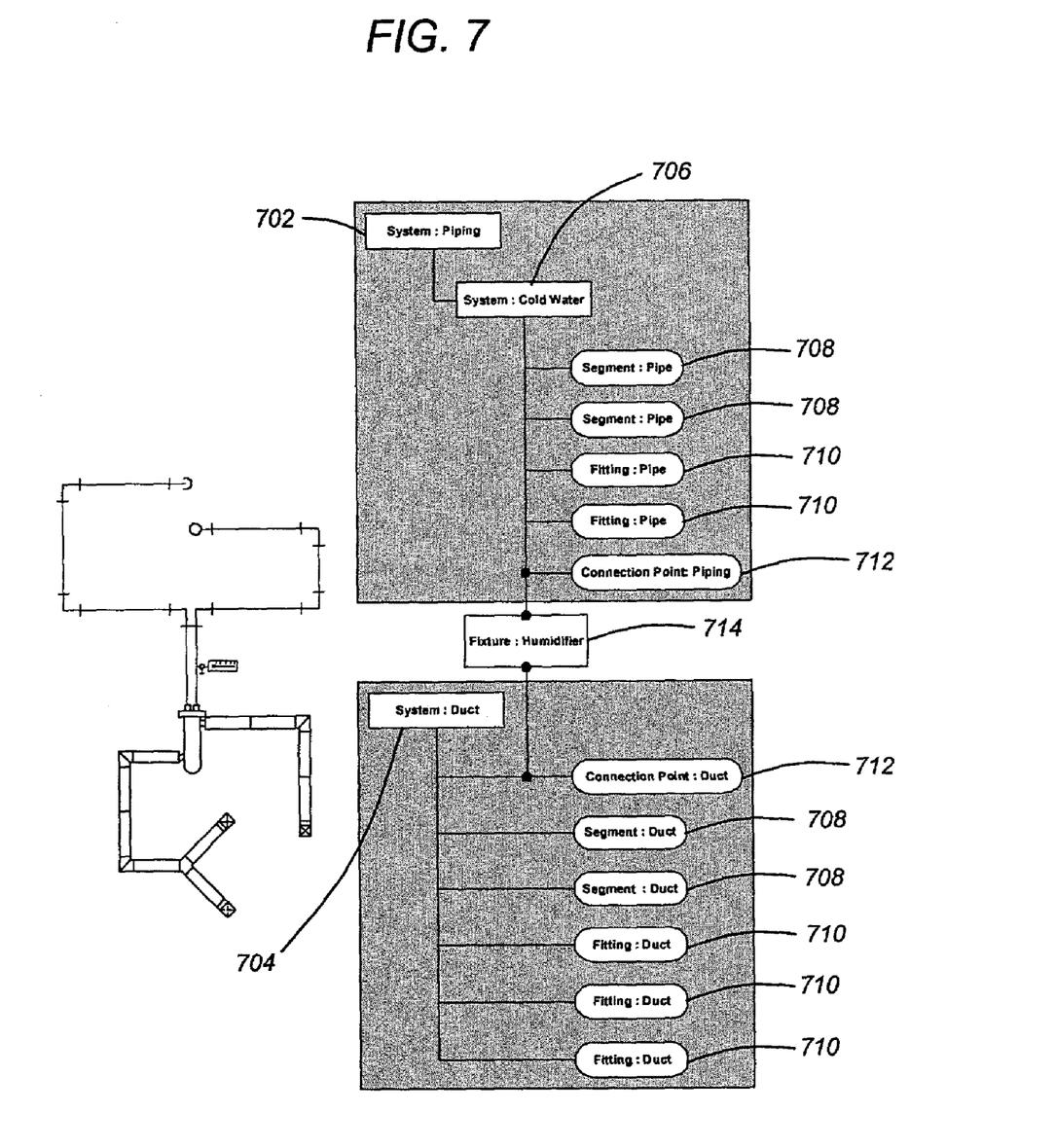
FIG. 7 illustrates an example of the styles and criteria of two subsystems in accordance with one or more embodiments of the invention.

FIG. 7 illustrates an example of the styles and criteria of two subsystems in accordance with one or more embodiments of the invention. As illustrated, there are two subsystems: piping 702 and duct 704. The piping system 702 has a general style 706 that indicates the type of fluid (i.e., cold water) supported. Each subsystem 702–704 also has various segments 708 and fittings 710. Further, the subsystems 702-704 connect through connectors/connection points 712 at a fixture 714.

Figure 8:
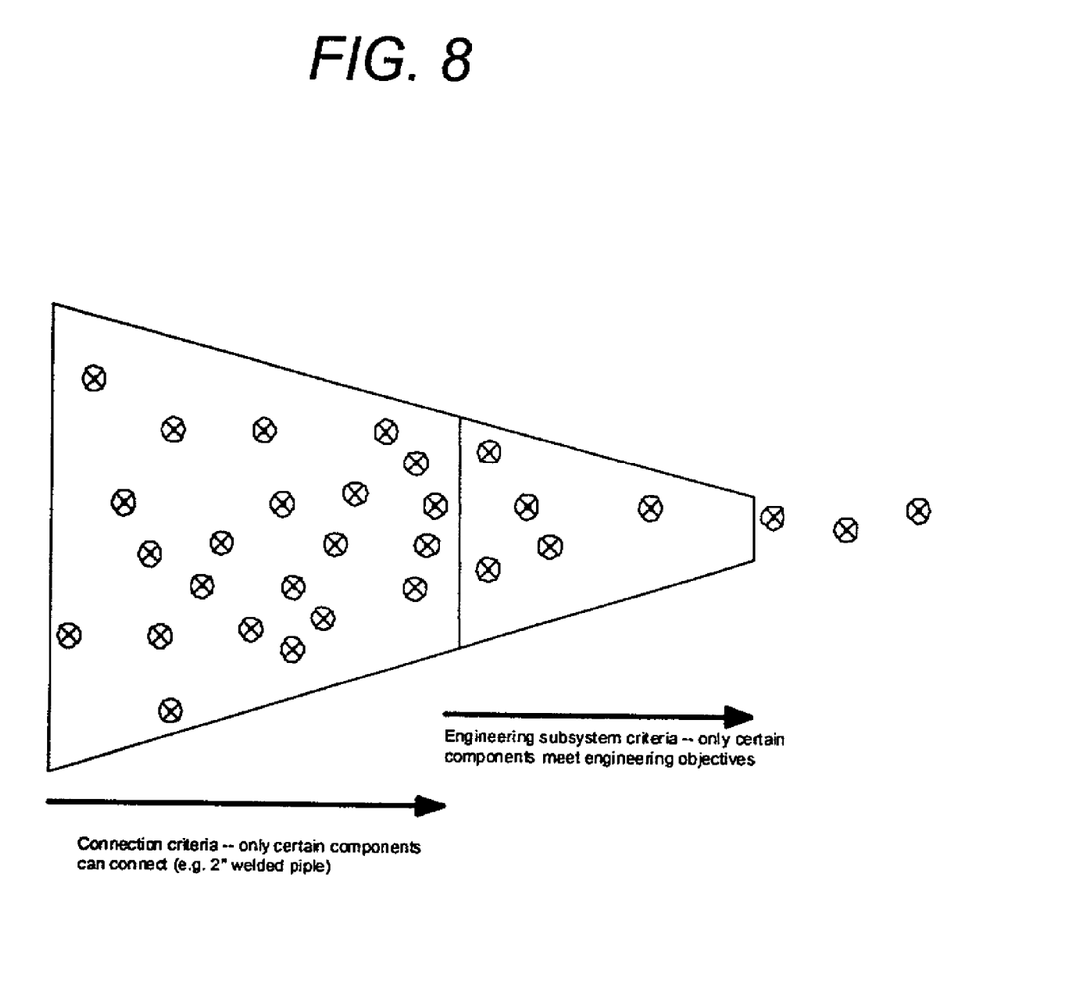
FIG. 8 illustrates a funnel of automated decision making in accordance with one or more embodiments of the invention.

Each time an engineer or designer adds a component to a building system, logical constraints may limit the type of component that may be selected. A "funnel" of automated decision-making based on the context of a new building services component being added to an existing system may be enabled in one or more embodiments. FIG. 8 illustrates such a funnel in accordance with one or more embodiments of the invention. As illustrated, at different stages, logical constraints/criteria are applied and limit the field of components that may be used.

To be useful, design criteria should be a well-defined constraint that can be queried from or attached to the building system. At a base level, two style definitions may drive the "funnel" decision-making to help automate or semi-automate the correct selection of components either in initial placement or in a revision (replacement): physical style and conceptual style.

The connection style is a characteristic of the component that defines the type of adaptable part 400 that can be assembled within the subsystem. For example, flanged pipe is one property of a connector style. A valid pipe connection can occur when the profiles match (e.g. both 3" round) and they are both flange pipe style components. Note that the style may cross all components: equipment 406, fittings 404, and segments 402.

Further, the connection style describes the type of subsystem being designed. The conceptual style characterizes the type of fluid carried through the building system and allows a logical check to be sure the connections made between two subsystems are valid. In FIG. 8, the valid parts that may be selected are automatically limited by knowing both the engineering subsystem and the physical characteristics of the components. Based on filtering through the funnel, the number of valid parts that may be selected is much smaller and selection is easier.

In the extreme case, typical of high end piping system, a fully specification-driven approach is used. Such an approach may actually drive the funnel criteria to a sufficient level of detail to unambiguously select a single component for a particular engineering objective (e.g., a control valve, 90 degree elbow turn, etc.). To support this next level of "engineering criteria" a more complex rules-based system must be enabled.

Adaptable parts 400 support rules based customization. To provide such support, customized rules may be implemented with simple programming routines (e.g., a visual basic application) and called during part selection/replacement.

Rules-based design criteria may include simple properties, ranges of properties, and procedures executed at a well-defined system state or event. The following are examples of rules-based design criteria:

System Location—The physical location of the part of the building the system serves.
  Sizing Method—Enumeration that identifies the methodology to be used to size the system components.
  PressureClass—Nominal pressure rating of the system components.
  LeakageClass—Nominal leakage rating for the system components.
  FrictionLoss—The pressure loss due to friction per unit length.
  LiningType—The insulation lining type to be used.
  InsulationType—The insulation to be used.
  ScrapFactor—Sheet metal scrap factor.
  MinimumHeight—The minimum height.
  MinimumWidth—The minimum width.
  MaintenanceInformation—Defines information about maintenance.

Content Management & Parts/Equipment Library

Since building systems are often assembled from manufactured, off-the-shelf, and custom prefabricated components, a key feature may include effectively managing the library of parts and equipment available for design and engineering. To support effective management, parts and equipment may be classified/organized into various states. For example, all parts/equipment may exist in a design in a genetic state, engineering-specific state, manufacturer specific state, etc.

As described above, in the genetic state, the object may be a "placeholder" that has not yet been engineered to specific requirements (e.g., does not have sizing information). For example, a boiler or air handler may be placed in the drawing early to define space requirements. The heating and ventilation loads may not yet be defined so it is impossible to select equipment at this level of definition, but it is still useful early in the design cycle because it communicates information to the architect.

In the engineering-specific state, the part/equipment has been fully specified. Heating and cooling capacities, fan sizes, air diffuser sizes etc. have been established and it is possible to select manufactured parts/equipment based on this information. However, a particular manufacturer may not have been selected when an object is in an engineering-specific state. Such a state may be useful when a design is required to be submitted without identifying a specific manufacturer.

In the manufacturer-specific state, an exact manufacturer and part number may have been selected/identified for an object in the specific state.

To support a wide range of customer preferences, embodiments may allow the insertion of parts & equipment using any of the states listed above. Some HVAC designers/engineers will place air diffusers and know the air delivery requirements to the space (e.g., engineering-specific or manufacturer-specific) while others may place the air diffusers early (to stake out their place in the ceiling grid) and therefore will place generic diffusers, which are later refined.

Substitution of parts & equipment follows a similar pattern. A part may change due to a change elsewhere in the system, or a change from the architect. A generic part must change to at least an engineering-specific part. Engineering-specific parts may be mapped to manufacture-specific parts (some designs require the submission of three [3] equivalent manufacturers for each piece of equipment). In some cases, engineers may design with a specific piece of equipment in mind, and subsequently strip out the manufacturer-specifics due to guidelines in final design deliverables.

Content (e.g., parts and equipment that can be generalized to include doors/windows) may be viewed in three (3) forms: design data, project data library, and manufacturer's data.

Design data comprises instances of content data placed in drawing files, listed on schedules, etc. The project data library comprises a master set of content data (e.g., owned by a CAD Manager, shared by project team(s), etc.). Manufacturer's data (web/aggregators) is always changing and is difficult to keep up to date.

The design data and project data may be generic, engineering-specific, or manufacturer-specific. The data is organized from a CAD-centric perspective and is therefore very CAD-like as blocks, styles, etc. In contrast, the data available on the web, or even from content aggregators (e.g., CMD, Thompson, McGraw-Hill, and Sweets), tends to support a wider range of "customers" and is not CAD-centric. Customers are facility owners, engineers, other manufacturers, etc. The data published by customers is often in a detailed specification, with the exact specifications varying from manufacturer to manufacturer.

Figure 9:
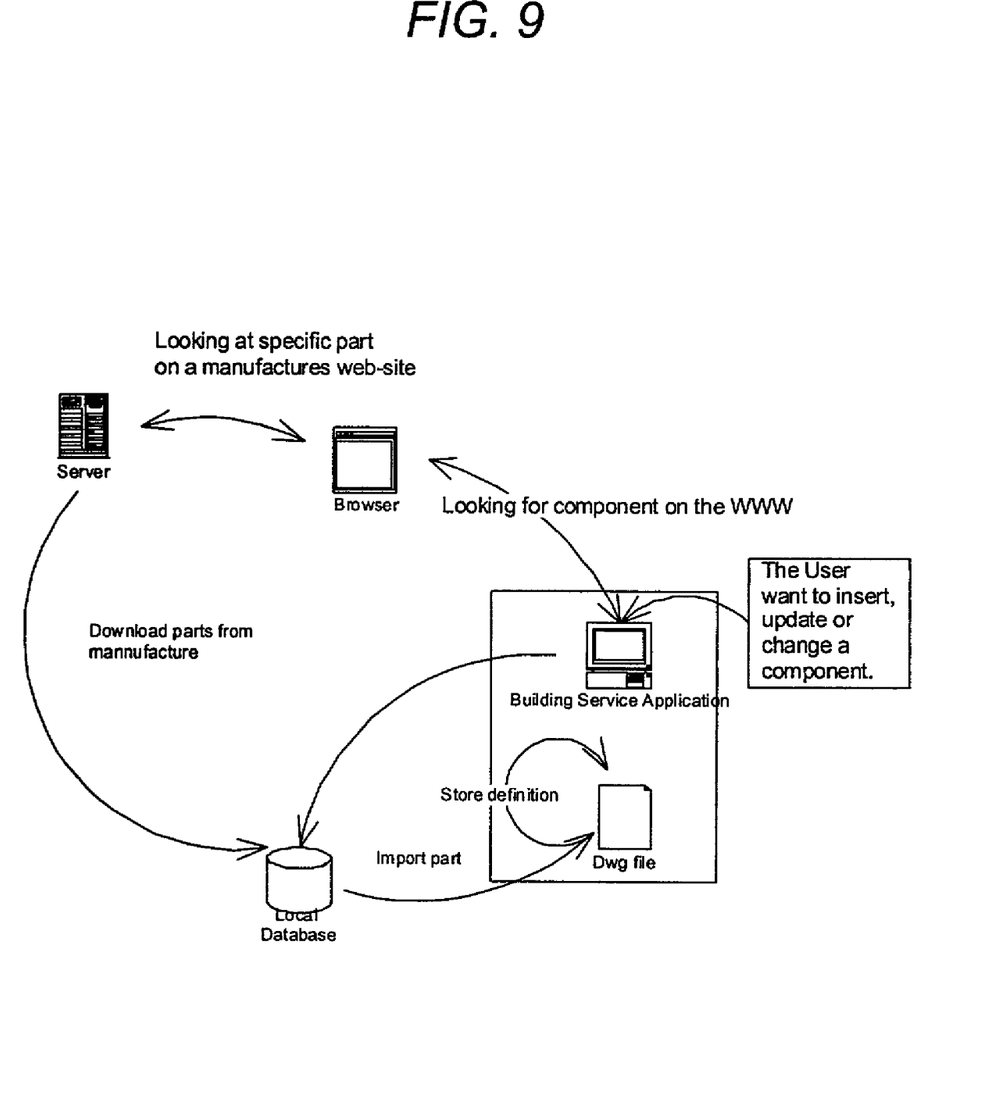
FIG. 9 illustrates a workflow to choose real-world parts in accordance with one or more embodiments of the invention.

Accordingly, design data and the project data library are often highly consistent within a design team (or within a company). However, manufacturer's data often varies tremendously and can be difficult to find or synchronize with the design data required by a design team. If content were filly accessible at all levels, the workflow to choose real-world parts might appear as illustrated in FIG. 9.

There is considerable "market demand" to quickly and easily find manufactured components suitable for building design & construction. Customers (building owners, contractors, etc.) often control costs by aggressively comparing and substituting building components. Taken to an extreme, this practice can introduce poorly designed buildings if the substitution criteria are not well defined or prove to be inadequate and "equivalent" substitution may prove to be a poor substitute.

Various business pressures are relevant in determining a suitable manufactured component. For example, a contractor/building owner may save money by "shopping around" for the most competitive parts. Further, architects/engineers/designers often want to insure that the quality of their design is carried through to the final construction.

Also, manufacturers often want to reach as many potential buyers of their components as possible and to differentiate themselves and add proprietary value. However, attempting to reach many potential buyers may be an opposing force to a manufacturer differentiating themselves. For example, every manufacturer of air diffusers (or doors and windows) wants to be considered when a potential buyer investigates options for a new or renovated building project. This suggests that all components should be defined in a consistent and easy to compare manner (invites a data standard). However, manufacturers want to differentiate themselves to provide an impression of greater quality or otherwise superior catalog of parts (e.g., unique data that hinders easy comparison using standard data).

A mechanism may be used to support content as generic, engineering-specific, and manufacturer specific, with a storage mechanism that facilitates project teams sharing a common library of parts & equipment. This "internal solution" for content may also integrate with an external, web-based XML data standard.

Such a mechanism may utilize "smart content". Smart content may be stored outside of a drawing file in a hybrid "CAD-centric" and "web-friendly" (XML-based) format. Additionally, smart content may be inserted as "snap-together" persistent data resembling. The use of smart content allows the use of an external data library to store the project-wide content yet makes each drawing file stand-alone. Drawing files can be shared without any dependencies on the project data library. Accordingly, a local project library may be required only if part substitutions or part additions are made.

Depending on the environment, the use of "smart content" may vary. For example, in a CAD environment, implicit graphics may be used only for limited cases such as duct/pipe segments, with a multi-view block type of mechanism used to represent persistent graphics for all fittings and fixtures. Additionally, in a CAD environment, "connectors" may be integrated to enable snap-together behavior based on both concept (subsystem type) and physical (shape and size of fittings) styles.

In a project data library (and web) environment, simple XML-based data structures may be used to store content and a "graphical definition" may be represented as an attribute of each content object. Further, graphical representations may be stored as either explicit graphics parameters or as multi-view block references.

AEC content may mean different things to different AEC professionals/applications. Many providers have traditionally adopted an appropriately CAD-centric view of content (e.g. block libraries). However, for the requirements of building services, and for general interoperability across varied applications, such an assumption may no longer be valid.

The basic definition of a part may be expanded to include a reference to the part's graphical definition. When considering graphical data, it's important to keep a non-CAD-centric perspective. Accordingly, explicit graphics may be simply additional data that can be added to the part definition. The graphics are generally optional from a "web import" perspective, although once a part has been inserted into a design, it may be maintained along with the appropriate graphical definition.

Display Representations

As described above, an object may have multiple display representations. For example, the following display representations may be supported in accordance with one or more embodiments of the invention:

- Schematic view—Represented by a line (and other single curves) and symbology
- Single line 2D view—Represented by lines (and arcs/curves as needed) with support for symbols indicating vertical rise/drop
- Double line 2D—Represented by two or three lines (optional centerline)
- Single line 3D view—Represented by a line to show the centerline path
- 3D representation(s)
- Interference views
- Isometric or Riser Diagram Views Flow Analysis and Design Tools Once parts are inserted into a model, the parts can acquire properties useful in analysis and part resizing/re-selection. For example, properties regarding pressure within a system may be used to satisfy a particular requirement.

Design tools may be utilized to assist the user in his/her design process. Examples of design tools include automated pipe or duct sizing, checking of pressure drops and equipment requirements, validation of system and subsystem connectivity. At a fundamental level, tracking connectivity and pressure values throughout a system enables a level of intelligence that translates into a set of very powerful design tools.

General Flow

Figure 10:
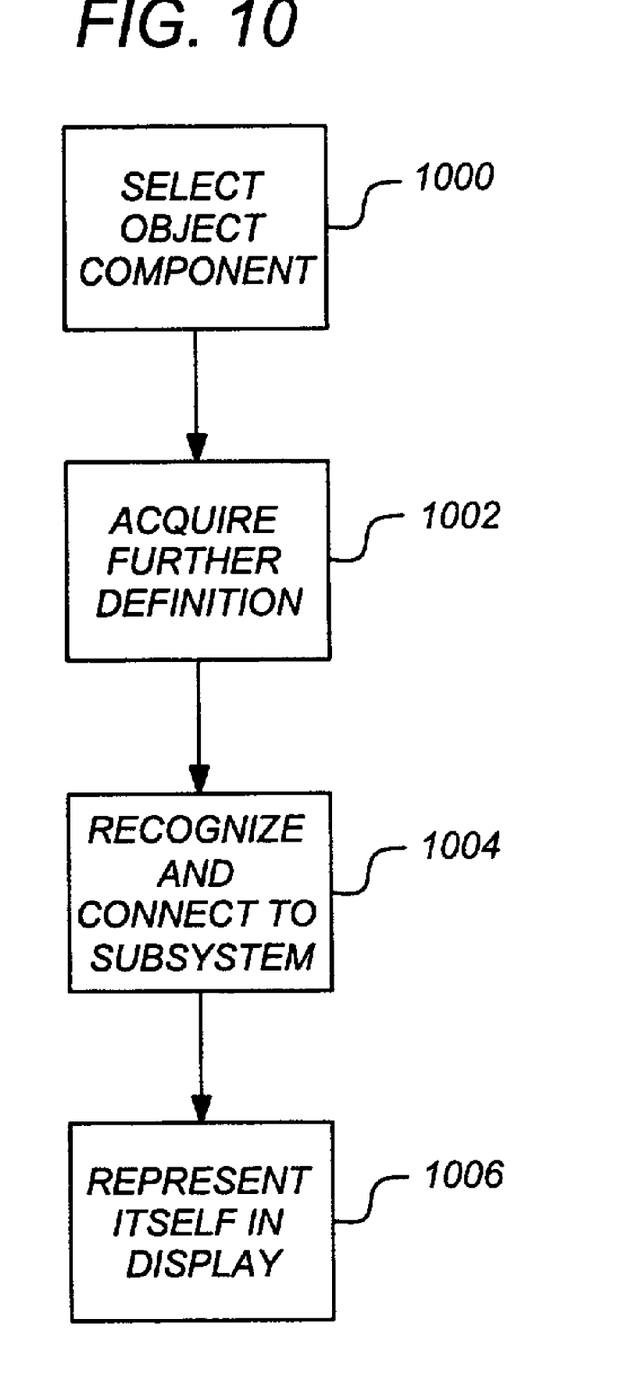
FIG. 10 is a flow chart that illustrates the general flow and use of a multi-representation building system data structure in accordance with one or more embodiments of the invention.

FIG. 10 is a flow chart that illustrates the general flow and use of a multi-representation building system data structure in accordance with one or more embodiments of the invention.

At step 1000, a single object component (i.e., an adaptable part) that can represent a real world component used throughout a building life cycle, from preliminary design throughout a life of the building is selected (e.g., a component of an AEC building system in a CAD application). The component is easily modifiable and may be identifiable (i.e., using an identity). For example, one or more dimensions may be easily modified. Alternatively, a similar component with a similar function and properties may be looked up and replace the single object component. Additionally, the single object may be matched to specific design criteria based on one or more pre-defined specifications of one or more design rules.

At step 1002, the single object component acquires further definition as design decisions are made. During step 1002, the single object component can gain one or more characteristics of an engineering-specific part that can be further characterized to specify a manufacturer-specific part. Such characteristics may include real world physical properties and/or engineering functions of a fluid property (e.g., transport and manipulation of a fluid). To acquire further definition, a real world component may be selected from a part/equipment library and assigned to the single object component. The part/equipment library may comprise generic, engineering-specific, and/or manufacturer specific parts.

At step 1004, the single object component and a connector of the object component recognize and automatically connect to a valid subsystem. Such connecting may be based on logical rules of subsystem type and a connection profile. This process may also entail checking for interference with an existing part of a building model (e.g., a structural object). Further, a connector of the object may comprise a medium, a subsystem, a size, a direction, a position, and one or more rules.

At step 1006, the single object component represents itself in one or multiple graphical displays that may depend on a context of the object. The display may comprise a real physical size and shape and may be flexible and customizable to support product localization and end-user customization.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An adaptable multi-representation building systems data structure stored by a program comprising a single object that can represent a real world component used throughout a building life cycle, from preliminary design throughout a life of the building, wherein the data structure comprises:
    a connector for recognizing and automatically connecting to a valid subsystem;
    properties for enabling the object to represent itself in multiple graphical and non-graphical displays; and
    one or more characteristics of the real world component for further defining the object as design decisions are made.

2. The data structure of claim 1 wherein the connector automatically connects to the valid subsystem based on one or more logical rules of subsystem type and one or more connection profiles.

3. The data structure of claim 1 wherein one of the characteristics comprises a real world physical property.

4. The data structure of claim 1 wherein one of the characteristics comprise an engineering function of a fluid property.

5. The data structure of claim 4 wherein the engineering function comprises transport and manipulation of a fluid.

6. The data structure of claim 1 wherein the single object is easily modifiable.

7. The data structure of claim 6 wherein one or more dimensions of the single object are easily modifiable.

8. The data structure of claim 6 wherein a component with a similar function and properties can be easily looked up and replace the single object.

9. The data structure of claim 1 wherein the single object can check for interference with a part of a building model.

10. The data structure of claim 9 wherein the part of the building model comprises a structural object, a wall, or other adaptable part.

11. The data structure of claim 1 wherein the single object can represent itself in multiple graphical displays depending on a context.

12. The data structure of claim 1 wherein a graphical display comprises a real physical size and shape of the real world component.

13. The data structure of claim 1 wherein the multiple graphical displays are flexible and customizable to support product localization, manufacturers, and end-user customization.

14. The data structure of claim 1 wherein design rules provide for matching the single object to specific design criteria based on one or more pre-defined specifications.

15. The data structure of claim 1 wherein the single object supports an ability to select and assign a real world component from a part/equipment library to itself.

16. The data structure of claim 15 wherein the part/equipment library comprises generic, engineering-specific, and manufacturer specific parts.

17. The data structure of claim 1 wherein the single object comprises an identity.

18. The data structure of claim 1 wherein the connector interfaces with other systems or objects and comprises:
a domain;
a subsystem;
a profile and size;
a direction;
a position and rotation;
a connection type; and
one or more rules.

19. The data structure of claim 1 wherein the single object is a component of an architecture, engineering, construction (AEC) building system in a computer-aided design (CAD) application.

20. A method for selecting a real world component in a computer system comprising:
selecting a single object component that represents a real world component used throughout a building life cycle, from preliminary design throughout a life of the building, wherein:
as design decisions are made, the single object component acquires further definition by gaining one or more characteristics to specify the real-world component;
the single object component and a connector of the object component recognize and automatically connect to a valid subsystem; and
the single object component represents itself in a graphical display.

21. The method of claim 20 further comprising connecting the single object component to the valid subsystem based on logical rules of subsystem type and one or more connection profiles.

22. The method of claim 20 wherein one of the characteristics comprises real world physical properties.

23. The method of claim 20 wherein one of the characteristics comprises an engineering function of a fluid property.

24. The method of claim 23 wherein the engineering function comprises transport and manipulation of a fluid.

25. The method of claim 20 wherein the single object component is easily modifiable.

26. The method of claim 25 wherein one or more dimensions of the single object component are easily modifiable.

27. The method of claim 25 further comprising:
looking up a second component with a similar function and properties to the single object component; and
replacing the single object component with the second component.

28. The method of claim 20 further comprising checking for interference between the single object component and a part of a building model.

29. The method of claim 28 wherein the part of the building model comprises a structural object, a wall, or other adaptable part.

30. The method of claim 20 wherein the single object component can represent itself in multiple graphical displays depending on a context.

31. The method of claim 20 wherein a graphical display comprises a real physical size and shape of the real world component.

32. The method of claim 20 wherein the graphical display is flexible and customizable to support product localization, manufacturers, and end-user customization.

33. The method of claim 20 further comprising matching the single object to specific design criteria based on one or more pre-defined specifications of one or more design rules.

34. The method of claim 20 further comprising:
selecting a real world component from a part/equipment library; and
assigning the real world component to the single object component.

35. The method of claim 34 wherein the part/equipment library comprises generic, engineering-specific, and manufacturer specific parts.

36. The method of claim 20 wherein the single object component comprises an identity.

37. The method of claim 20 wherein the connector interfaces with other systems or objects, and comprises:
a domain;
a subsystem;
a profile and size;
a direction;
a position and rotation;
a connection type; and
one or more rules.

38. The method of claim 20 wherein the single object component is a component of an architecture, engineering, construction (AEC) building system in a computer-aided design (CAD) application.

39. An apparatus for selecting an object in a computer system comprising:
(a) a computer system having a memory and a data storage device coupled thereto;
(b) one or more computer programs, performed by the computer system, for selecting a single object component in the memory that represents a real world component used throughout a building life cycle, from preliminary design throughout a life of the building, wherein
(i) as design decisions are made, the single object component acquires further definition by gaining one or more characteristics to specify the real-world component;
(ii) the single object component and a connector of the object component recognize and automatically connect to a valid subsystem; and
(iii) the single object component represents itself in a graphical display.

40. The apparatus of claim 39 wherein the one or more computer programs are further configured to connect the single object component to the valid subsystem based on logical rules of subsystem type and one or more connection profiles.

41. The apparatus of claim 39 wherein one of the characteristics comprises real world physical properties.

42. The apparatus of claim 39 wherein one of the characteristics comprises an engineering function of a fluid property.

43. The apparatus of claim 42 wherein the engineering function comprises transport and manipulation of a fluid.

44. The apparatus of claim 39 wherein the single object component is easily modifiable.

45. The apparatus of claim 44 wherein one or more dimensions of the single object component are easily modifiable.

46. The apparatus of claim 44, wherein the one or more computer programs are further configured to:
    look up a second component with a similar function and properties to the single object component; and
    replace the single object component with the second component.

47. The apparatus of claim 39, wherein the one or more computer programs are further configured to check for interference between the single object component and a part of a building model.

48. The apparatus of claim 47 wherein the part of the building model comprises a structural object, a wall, or other adaptable part.

49. The apparatus of claim 39 wherein the single object can represent itself in multiple graphical displays depending on a context.

50. The apparatus of claim 39 wherein a graphical display comprises a real physical size and shape of the real world component.

51. The apparatus of claim 39 wherein the graphical display is flexible and customizable to support product localization, manufacturers, and end-user customization.

52. The apparatus of claim 39, wherein the one or more computer programs are further configured to match the single object component to specific design criteria based on one or more pre-defined specifications of one or more design rules.

53. The apparatus of claim 39, wherein the one or more computer programs are further configured to:
    select a real world component from a part/equipment library; and
    assign the real world component to the single object component.

54. The apparatus of claim 53 wherein the part/equipment library comprises generic, engineering-specific, and manufacturer specific parts.

55. The apparatus of claim 39 wherein the single object component comprises an identity.

56. The apparatus of claim 39 wherein the connector interfaces with other systems or objects, and comprises:
    a domain;
    a subsystem;
    a profile and size;
    a direction;
    a position and rotation;
    a connection type; and
    one or more rules.

57. The apparatus of claim 39 wherein the single object component is a component of an architecture, engineering, construction (AEC) building system in a computer-aided design (CAD) application.

58. An article of manufacture comprising a program storage medium readable by a computer and embodying one or more instructions executable by the computer to perform a method for selecting a real world component in a computer system, the method comprising:
    selecting a single object component that represents a real world component used throughout a building life cycle, from preliminary design throughout a life of the building, wherein:
    as design decisions are made, the single object component acquires further definition, gaining one or more characteristics of a fully engineered part that can be further characterized to specify a real-world manufactured part;
    the single object component and a connector of the object component recognize and automatically connect to a valid subsystem; and
    the single object component represents itself in a graphical display.

59. The article of manufacture of claim 58, wherein the method comprises connecting the single object component to the valid subsystem based on logical rules of subsystem type and a connection profile.

60. The article of manufacture of claim 58 wherein one of the characteristics comprises real world physical properties.

61. The article of manufacture of claim 58 wherein one of the characteristics comprises an engineering function of a fluid property.

62. The article of manufacture of claim 61 wherein the engineering function comprises transport and manipulation of a fluid.

63. The article of manufacture of claim 58 wherein the single object component is easily modifiable.

64. The article of manufacture of claim 63 wherein one or more dimensions of the single object component are easily modifiable.

65. The article of manufacture of claim 63, wherein the method further comprises:
    looking up a second component with a similar function and properties to the single object component; and
    replacing the single object component with the second component.

66. The article of manufacture of claim 58, wherein the method further comprises checking for interference between the single object component and a part of a building model.

67. The article of manufacture of claim 66 wherein the part of the building model comprises a structural object.

68. The article of manufacture of claim 58 wherein the single object component can represent itself in multiple graphical displays depending on a context.

69. The article of manufacture of claim 58 wherein a graphical display comprises a real physical size and shape of the real world component.

70. The article of manufacture of claim 58 wherein the graphical display is flexible and customizable to support product localization and end-user customization.

71. The article of manufacture of claim 58, wherein the method further comprises matching the single object to specific design criteria based on one or more pre-defined specifications of one or more design rules.

72. The article of manufacture of claim 58, wherein the method further comprises:

selecting a real world component from a part/equipment library; and assigning the real world component to the single object component.

73. The article of manufacture of claim 72 wherein the part/equipment library comprises genetic, specific, and manufacturer specific parts.

74. The article of manufacture of claim 58 wherein the single object component comprises an identity.

75. The article of manufacture of claim 58 wherein the connector interfaces with other systems or objects, and comprises:
a domain;
a subsystem;
a size;
a direction;
a position; and
one or more rules.

76. The article of manufacture of claim 58 wherein the single object component is a component of an architecture, engineering, construction (AEC) building system in a computer-aided design (CAD) application.

* * * * *